US010288761B2

(12) United States Patent
James et al.

(10) Patent No.: US 10,288,761 B2
(45) Date of Patent: May 14, 2019

(54) SYSTEMS AND METHODS FOR DETERMINING ANNULAR FILL MATERIAL BASED ON RESISTIVITY MEASUREMENTS

(71) Applicant: Schlumberger Technology Corporation, Sugar land, TX (US)

(72) Inventors: Simon Gareth James, Le Plessis-Robinson (FR); Ram Sunder Kalyanaraman, Vaucresson (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 296 days.

(21) Appl. No.: 14/736,228

(22) Filed: Jun. 10, 2015

(65) Prior Publication Data

US 2015/0369947 A1 Dec. 24, 2015

(30) Foreign Application Priority Data

Jun. 18, 2014 (EP) .................................... 14290180

(51) Int. Cl.
*G01V 3/20* (2006.01)
*G01V 3/02* (2006.01)
*G01V 3/38* (2006.01)

(52) U.S. Cl.
CPC .................. *G01V 3/20* (2013.01); *G01V 3/02* (2013.01); *G01V 3/38* (2013.01)

(58) Field of Classification Search
CPC . G01V 3/00; G01V 3/10; G01V 3/101; G01V 3/102; G01V 3/104; G01V 3/105; G01V 3/107; G01V 3/108
See application file for complete search history.

(56) References Cited

U.S. PATENT DOCUMENTS

| 5,510,712 A | 4/1996 | Sezginer et al. |
| 7,095,233 B1 * | 8/2006 | Tabanou .................. G01V 3/20 |
| | | 324/347 |

(Continued)

FOREIGN PATENT DOCUMENTS

| EP | 0902076 | 3/1999 |
| WO | 00/41480 | 7/2000 |
| WO | 2011/045005 | 4/2011 |

OTHER PUBLICATIONS

Wikipedia: "Well logging," Jun. 11, 2014, pp. 1-9, retrieved from the Internet at URL: http://en.wikipedia.org/w/index.php?title=Well-logging&oldid=612497929.

(Continued)

*Primary Examiner* — Tung X Nguyen
*Assistant Examiner* — Dominic E Hawkins
(74) *Attorney, Agent, or Firm* — Michael Dae

(57) ABSTRACT

Systems and methods for determining annular fill material using resistivity measurements are provided. In one example, a method is provided. The method may include placing a downhole tool into a cased well. The well may include an annulus located between a casing and a formation. The method may also include determining, by the downhole tool, resistivity measurements associated with portions of the well. Furthermore, the method may include identifying, by a computer, based at least in part on the resistivity measurements, the presence of annular fill materials in the well. Additionally, the method may include determining, by the computer based at least in part on the resistivity measurements, respective locations of the annular fill materials in the well.

20 Claims, 4 Drawing Sheets

(56) References Cited

U.S. PATENT DOCUMENTS

| | | | |
|---|---|---|---|
| 7,732,381 B2 | 6/2010 | Williams et al. | |
| 7,772,166 B1 | 8/2010 | Williams et al. | |
| 7,983,885 B2* | 7/2011 | Suarez-Rivera | E21B 49/00 702/6 |
| 8,756,017 B2* | 6/2014 | Hu | G01V 3/28 702/7 |
| 2001/0038287 A1* | 11/2001 | Amini | G01V 3/28 324/341 |
| 2002/0020528 A1* | 2/2002 | McCabe | E02D 3/12 166/276 |
| 2003/0080743 A1* | 5/2003 | Das | G01V 11/00 324/338 |
| 2003/0156494 A1* | 8/2003 | McDaniel | G01V 1/44 367/35 |
| 2006/0133204 A1* | 6/2006 | Froelich | E21B 47/0005 367/35 |
| 2007/0030007 A1* | 2/2007 | Moore | E21B 47/024 324/333 |
| 2008/0217024 A1* | 9/2008 | Moore | E21B 4/18 166/382 |
| 2009/0159334 A1* | 6/2009 | Alberty | E21B 21/08 175/40 |
| 2011/0255370 A1* | 10/2011 | Hirabayashi | G01V 1/42 367/31 |
| 2011/0284216 A1* | 11/2011 | Addis | E21B 47/01 166/250.01 |
| 2012/0075953 A1* | 3/2012 | Chace | E21B 47/0005 367/35 |
| 2012/0111561 A1* | 5/2012 | Frey | E21B 47/102 166/250.03 |
| 2012/0155508 A1* | 6/2012 | Dria | E21B 43/164 374/107 |
| 2013/0114377 A1* | 5/2013 | Frisch | E21B 47/0005 367/35 |
| 2014/0158363 A1* | 6/2014 | Deen | C09K 8/06 166/336 |
| 2014/0191761 A1* | 7/2014 | San Martin | E21B 47/011 324/339 |
| 2014/0318783 A1* | 10/2014 | Martin | E21B 33/14 166/292 |
| 2015/0198038 A1* | 7/2015 | Bartetzko | E21B 49/00 166/250.05 |
| 2015/0355366 A1* | 12/2015 | Monteiro | E21B 47/10 324/324 |

OTHER PUBLICATIONS

Wikipedia: "Resistivity logging," Feb. 8, 2014, pp. 1-1, retrieved from the Internet at URL: http://en.wikipedia.org/wiki/Resistivity_logging.

Extended search report for the equivalent European patent application No. 14290180.0 dated Dec. 3, 2014.

* cited by examiner

SYSTEMS AND METHODS FOR DETERMINING ANNULAR FILL MATERIAL BASED ON RESISTIVITY MEASUREMENTS

CROSS REFERENCE TO RELATED APPLICATIONS

This application claims the benefit of priority to European Patent Application Number: 14290180.0 to Simon Gareth James, et al, filed on Jun. 18, 2014, and entitled "Systems and Methods for Determining Annular Fill Material Based on Resistivity Measurements," which is hereby incorporated in its entirety for all intents and purposes by this reference.

FIELD OF THE DISCLOSURE

The disclosure generally relates to determining annular fill material, and more particularly relates to systems and methods for determining annular fill material using resistivity measurements.

BACKGROUND

When a well is drilled into a geological formation, logging tools are used to determine a variety of characteristics of the well. Some logging tools may determine characteristics of the surrounding rock formation. Other logging tools may measure characteristics of fluids and/or other annular fill material present in the well. Still other logging tools may determine when cement, resin, and/or the like has been properly installed in the well to achieve zonal isolation.

In certain cases, a logging tool may be configured to detect the presence and/or location of one or more annular fill materials behind the casing of a well. To this end, cement may have distinguishable acoustic properties that may facilitate its detection by acoustic logging tools. However, certain annular fill material, such as resin, may be associated with acoustic properties that have relatively low contrast with other annular fill material. As such, using acoustic measurements to distinguish between the resin and other annular fill materials may be challenging.

SUMMARY

A summary of certain embodiments disclosed herein is set forth below. It should be understood that these aspects are presented merely to provide the reader with a brief summary of these certain embodiments and that these aspects are not intended to limit the scope of the systems and methods described herein. Indeed, systems and methods described herein may encompass a variety of aspects that may not be set forth below.

Embodiments described herein relate to systems and methods for determining annular fill material using resistivity measurements. According to some embodiments, a method is provided. In one example, a method may include placing a downhole tool into a cased well. The well may include an annulus located between a casing and a formation. The method may also include determining, by the downhole tool, resistivity measurements associated with portions of the well. Furthermore, the method may include identifying, by a computer, based at least in part on the resistivity measurements, the presence of annular fill materials in the well. Additionally, the method may include determining, by the computer based at least in part on the resistivity measurements, respective locations of the annular fill materials in well.

According other embodiments, a system is provided. In one example, a system may include a logging tool, which may obtain resistivity measurements associated with portions of an annulus in a cased well. Additionally, the system may also include a data processing component. The data processing component may include a processor and a memory. The memory may store computer-executable instructions, that when executed by the processors, causes the processor to identify, based at least in part on the resistivity measurements, a presence of annular fill materials in the annulus. The computer-executable instructions may also cause the processor to determine, based at least in part on the resistivity measurements, respective locations of the annular fill materials in the annulus.

According to other embodiments, a non-transitory computer-readable medium is provided. In one example, the computer-readable medium may store computer-executable instructions, that when executed by a processor, causes the processor to receive resistivity measurements from a logging tool. Additionally, the computer-executable instructions may cause the processor to identify, based at least in part on the resistivity measurements, annular fill materials in an annulus located between a casing and a well. The computer-executable instructions may also cause the processor to determine, based at least in part on the resistivity measurements, respective locations of the annular fill materials.

Various refinements of the features noted above may be made in relation to various aspects described herein. Further features may also be incorporated in these various aspects as well. These refinements and additional features may exist individually or in any combination. For instance, various features discussed below in relation the illustrated embodiments may be incorporated into any of the above-described aspects alone or in any combination. The brief summary presented above is intended just to familiarize the reader with certain aspects and contexts of embodiments described herein without limitation to the claimed subject matter.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Additionally, depending on the context, singular and plural terminology may be used interchangeably.

Figure 1A:
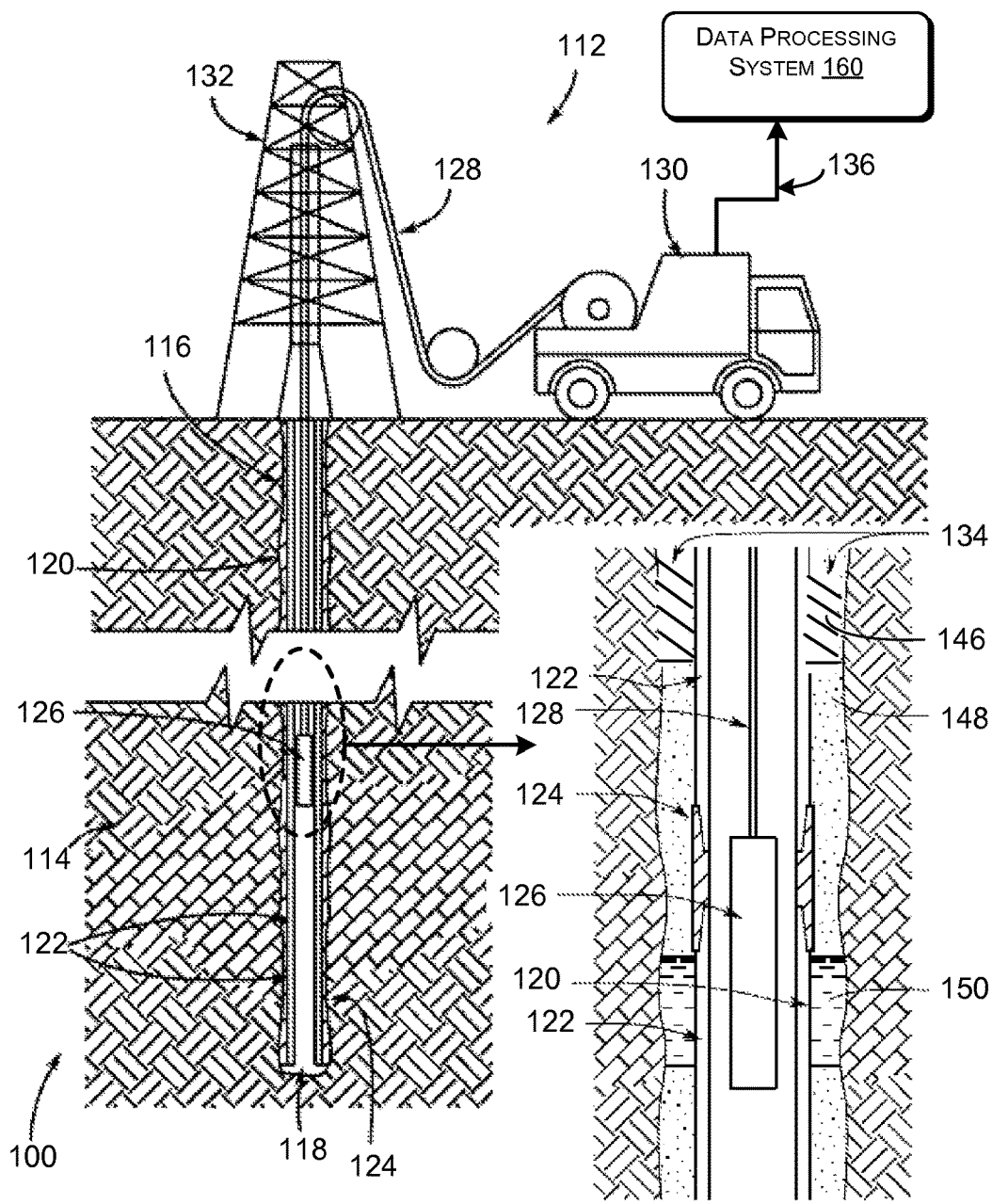
FIG. 1A illustrates an example system for determining annular fill materials based on resistivity measurements in accordance with one or more example embodiments.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided for thoroughness and completeness, and will fully convey the scope to those skilled in the art. Like numbers in the figures refer to like, but not necessarily the same or identical, elements throughout. Hence, if a feature is used across several drawings, the number used to identify the feature in the drawing where the feature first appeared will be used in later drawings.

DETAILED DESCRIPTION

Overview

Described herein are various implementations related to determining the presence of or characteristics of annular fill material based on resistivity measurements. Broadly, the systems and methods described herein may facilitate the determination/identification of one or more annular fill materials using resistivity measurements associated with the one or more annular fill materials in one or more portions of an annulus of a cased well. The resistivity measurements may be used to uniquely identify the presence of or other characteristics of one or more annular fill materials (e.g., resin, cement, conductive drilling fluids, non-conductive drilling fluids, etc.) behind a casing in the well. The resistivity measurements may also be used to determine the specific locations of one or more annular fill materials in the well. In this manner, certain embodiments described herein can provide technical solutions to enable personnel to evaluate the presence and location of particular annular fill materials, which can result in improved well quality and performance. Furthermore, the resistivity measurements may be used to determine characteristics or features of the annular fill materials. For example, the resistivity measurements may indicate the presence of cracks or channels or defects in a zone of annular fill material.

These and other embodiments will be described in more detail through reference to the accompanying drawings in the detailed description that follows. This brief introduction, including section titles and corresponding summaries, is provided for the reader's convenience and is not intended to limit the scope of the claims or the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Embodiments

When a well is drilled, a variety of logging tools may be used to determine characteristics of the well. These characteristics may include parameters of the surrounding geological formation, the shape and texture of the wellbore, or the quality of cement installation behind a casing, to name a few. When logging data is obtained in the well, a downhole logging tool may be moved through the well to obtain certain physical measurements. By processing these physical measurements, the characteristics of the well may be estimated. In the case of cement evaluation, for example, an acoustic logging tool may emit pulses of acoustic energy against a casing of the wellbore and measure the acoustic waveforms that return. Because the returning waveforms vary depending on the quality of the cement installation behind the casing—varying, for example, on whether the material behind the casing has acoustic properties more like a liquid, gas, or solid—the returning waveforms can be used to ascertain whether the material on the other side of the casing is a solid, and therefore, in at least one example, likely to be properly installed cement.

Some conventional developments in well drilling may call for installation of the casing using resin or other types of material instead of cement. As mentioned above, various types of materials may have a range of acoustic properties. Certain types of materials may not provide sufficient contrast with other annular fill materials. In other words, other types of measurements may be used along with or instead of acoustic measurements to determine and/or detect the presence of resin in the well. As such, other downhole tools and/or methods may be used to determine or detect the presence of resin and/or other annular fill materials behind the casing. For example, as will be discussed below, a downhole logging tool may be configured to induce electrical current along one or more portions of the casing to determine electrical resistivity measurements associated with materials behind the casing. Based at least in part on the resistivity measurements, one or more annular fill materials in the well (e.g., the annulus) may be identified. Furthermore, the placement and/or location of the one or more annular fill materials in the well may be ascertained.

In view of the above, FIG. 1A schematically illustrates an example well-logging system 100 in accordance with one or more example embodiments. In particular, FIG. 1A illustrates surface equipment 112 above a geological formation 114. In the example of FIG. 1A, a drilling operation has previously been carried out to drill a wellbore 116, to run a casing string 118, and to seal an annulus 120—the space between the wellbore 116 and the casing string 118—with cementing and/or resin placement operations.

The casing string 118 may include several casing joints 122 (also referred to below as casing 122) coupled together by casing collars 124 to stabilize the wellbore 116. The casing joints 122 represent lengths of conductive pipe, which may be formed from steel or similar materials. In one example, the casing joints 122 each may be approximately 13 meters or 40 feet long, and may include an externally threaded (male thread form) connection at each end. A corresponding internally threaded (female thread form) connection in the casing collars 124 may connect two nearby casing joints 122. Coupled in this way, the casing joints 122 may be assembled to form the casing string 118 to a suitable length and specification for the wellbore 116. The casing joints 122 and/or collars 124 may be made of carbon steel, stainless steel, or other suitable materials to withstand a variety of forces, such as collapse, burst, and tensile failure, as well as chemically aggressive fluid. It will be appreciated that as used herein, the casing string 118 may be of any suitable length, and may extend back to the surface of the wellbore 116, though in other implementations, the length of the casing string 118 may not extend back to the surface of the wellbore 116.

The logging tool 126 may be deployed inside the wellbore 116 by the surface equipment 112, which may include a vehicle 130 and a deploying system such as a drilling rig 132. Data related to the geological formation 114 or the wellbore 116 gathered by the logging tool 126 may be transmitted to the surface, and/or stored in the logging tool 126 for later processing and analysis. As will be discussed further below, the vehicle 130 may be fitted with or may communicate with a computer and software to perform data collection and analysis. The surface equipment 112 may carry out various well logging operations to detect corrosion and other conditions. The well logging operations may measure parameters of the geological formation 114 (e.g., resistivity or porosity) and/or the wellbore 116 (e.g., temperature, pressure, fluid type, or fluid flowrate).

As described above, some measurements may be obtained by a downhole logging tool 126, for which various embodiments are described herein. In certain embodiments, the logging tool 126 may be configured to determine resistivity measurements for annular fill material behind the casing 118. Such measurements may be used to identify and determine the location and/or placement of the annular fill material in the annulus 120. Additionally, the example of FIG. 1A shows the logging tool 126 being conveyed through the wellbore 116 by a cable 128. Such a cable 128 may be a mechanical cable, an electrical cable, or an electro-optical cable that includes a fiber line protected against the harsh environment of the wellbore 116. In other examples, however, the logging tool 126 may be conveyed using any other suitable conveyance, such as coiled tubing or a borehole assembly (BHA) used for logging while drilling (LWD).

FIG. 1A also schematically illustrates a magnified view of a portion of the cased wellbore 116. As mentioned above, the logging tool 126 may obtain resistivity measurements relating to the presence of annular fill material 134, such as solids, liquids, or gases behind the casing 122. For instance, the logging tool 126 may obtain one or measures of electrical resistivity associated with one or more portions of the annulus 120 (e.g., at different depths of the annulus). Such measurements may be transmitted to the surface equipment 112. When the logging tool 126 provides such measurements to the surface equipment 112 (e.g., through the cable 128), the surface equipment 112 may pass the measurements as resistivity data 136 and/or corresponding signals to a data processing system, such as 160 shown in FIG. 1B. In other examples, the resistivity data 136 and/or corresponding signals may be processed by a similar data processing system, such as 160, at any other suitable location. The resistivity measurements may include, for example, an absolute resistivity value measured in the cased well which may be a resistivity value (e.g., 50 ohm-meters, 100 ohm-meters, 150 ohm-meters, etc.) through all layers (e.g., casing, annulus, etc.,) of the cased well. The resistivity measurements may also include an absolute resistivity measurement of the annulus of the cased well. In some embodiments, the resistivity measurements may include a resistivity range or a resistivity type (e.g., having high resistivity, slight resistivity, low resistivity, etc.) of the cased well and/or the annulus, or a resistivity indication, such as being above or below a resistivity threshold indicative of a presence or condition of annulus material, or an error reading indicative of a relatively high resistivity measurement, etc.). Embodiments of the disclosure may provide resistivity measurements including any combination of absolute resistivity values, resistivity ranges, or resistivity indications of the cased well and/or the annulus.

In some embodiments, the logging tool 126 may be used in an individual logging operation or in conjunction with various other tools in one or more logging operations. For instance, the logging tool 126 may be used with an acoustic cement evaluation tool, and the responses of the logging tool 126 and the acoustic tool may provide information relating to the presence of and/or characteristics of multiple types of annular fill material, such as cement, resins, conductive fluids, non-conductive fluids, or gases.

Figure 1B:
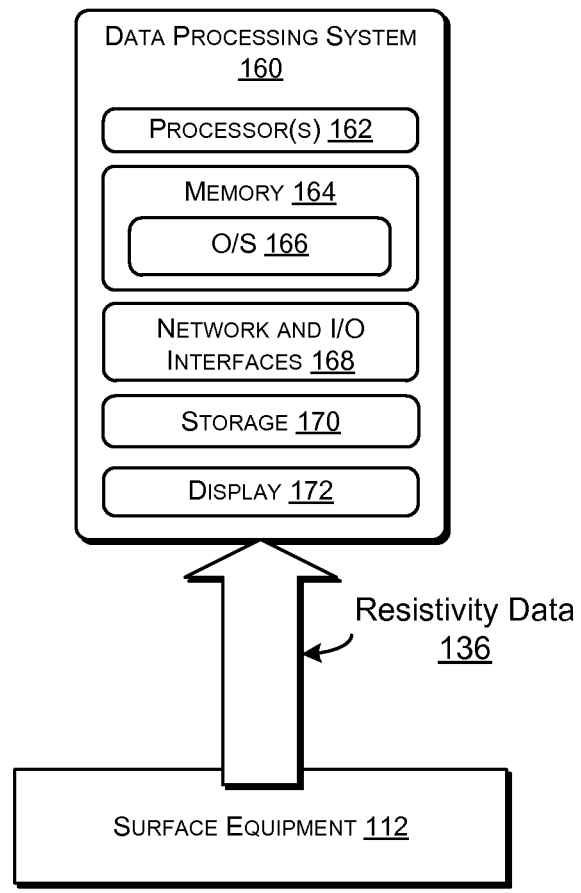
FIG. 1B illustrates a block diagram of an example data processing system in accordance with one or more example embodiments.

Referring now to FIG. 1B, a block diagram of the data processing system 160 is illustrated in accordance with one or more example embodiments. The data processing system 160 may be configured to perform various operations using the logging data, such as determining or identifying the presence and/or the locations of one or more annular fill materials 134 in the wellbore 116. Other operations may include, but are not limited to, executing testing applications, executing or performing simulations, reporting data, and conducting event forecasting and/or the like. As shown in FIG. 1B, the data processing system 160 may include one or more processors 162, a memory 164 storing an operating system (O/S) 166, network and input/output (I/O) interfaces 168, storage 170, and a display 172.

The one or more computer processors 162 may include one or more cores and may be configured to access and execute (at least in part) computer-readable instructions stored in the memory 164. The one or more computer processors 162 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The data processing system 160 may also include a chipset (not shown) for controlling communications between the one or more processors 162 and one or more of the other components of the data processing system 160. The one or more processors 162 may also include one or more application-specific integrated circuits (ASICs) or application-specific standard products (ASSPs) for handling specific data processing functions or tasks.

The memory 164 may include one or more computer-readable storage media (CRSM). In some embodiments, the memory 164 may include non-transitory media such as random access memory (RAM), flash RAM, magnetic media, optical media, solid state media, and so forth. The memory 164 may be volatile (in that information is retained while providing power) or non-volatile (in that information is retained without providing power). Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 164 may store an operating system 166 that includes a plurality of computer-executable instructions that may be implemented by the computer processor 162 to perform a variety of tasks to operate the interface(s) and any other hardware installed on the data processing system 160. The memory 164 may also store content that may be displayed by the data processing system 160 or transferred to other devices (e.g., headphones) to be displayed or played by the other devices. The memory 164 may also store content received from the other devices. The content from the other devices may be displayed, played, or used by the data processing system 160 to perform any tasks or operations that may be implemented by the computer processor 162 or other components in the data processing system 160.

The memory 164 may also include an operating system (O/S) 166, which may provide an interface between other application software executing on the same system and/or platform and hardware resources of the data processing system 160. More specifically, the operating system 166 may include a set of computer-executable instructions for managing hardware resources of the data processing system 160 and for providing common services to other application programs (e.g., managing memory allocation among various application programs). The operating system 166 may include any operating system now known or which may be developed in the future including, but not limited to, any consumer operating system, any server operating system, any mainframe operating system, or any other proprietary or freely available operating system.

The one or more network and I/O interfaces 168 may include one or more communication interfaces or network interface devices to provide for the transfer of data between the data processing system 160 and another device (e.g., network server) via one or more networks. The communication interfaces may include, but are not limited to: personal area networks (PANs), wired local area networks (LANs), wireless local area networks (WLANs), wireless wide area networks (WWANs), and so forth. The data processing system 160 may be coupled to the network via a wired or wireless connection. The communication interfaces may utilize acoustic, radio frequency, optical, or other signals to exchange data between the data processing system 160 and another device, such as an access point, a host computer, a server, a router, a reader device, and the like. The networks may include, but are not limited to, the Internet, a private network, a virtual private network, a wireless wide area network, a local area network, a metropolitan area network, a telephone network, and so forth.

The display 172 may include, but is not limited to, a liquid crystal display, a light-emitted diode display, or an electronic ink display. The display 172 may be used to show content to a user in the form of text, images, or video. In certain instances, the display 172 may also operate as a touch screen display that may enable the user to initiate commands or operations by touching the screen using certain finger or hand gestures.

As previously mentioned, the systems and methods described herein may facilitate determining the presence and/or location of one or more annular fill materials 134 in the annulus 120 of the wellbore 116. In certain embodiments, the one or more annular fill materials 134 may include resin (e.g., epoxy resins, polybutadiene resins, polyester resins, and/or the like), conductive drilling fluids, non-conductive drilling fluids, cement, gases, and/or the like. Resins may be associated with electrical resistivities on the order of approximately $10^{15}$ ohm-meters (e.g., approximately $3.28 \times 10^{15}$ ohm-feet) or higher. Conductive drilling fluids and cements may be associated with resistivities on the order of approximately $10^{-1}$ ohm-meters (e.g., approximately $3.28 \times 10^{-1}$ ohm-feet). Non-conductive drilling fluids may be associated with resistivities of between approximately $10^4$ ohm-meters (e.g., approximately $3.28 \times 10^4$ ohm-feet) and approximately $10^8$ ohm-meters (e.g., approximately $3.28 \times 10^8$ ohm-feet). As such, the contrast between the resistivities associated with these annular fill materials 134 may be sufficient to distinguish the materials 134 from each other. In this manner, determining resistivity measurements for the annular fill materials 134 may facilitate the identification of the materials 134 as well as their respective locations within the annulus 120. It will be understood that the resistivity measurements provided above are merely for illustrative purposes, and that other resistivity measurements associated with the annular fill materials 134 are also possible.

In some embodiments, a resistivity measurement may be an indication that the measurement is above a certain threshold at a location in the well. For example, the cased hole log data may indicate that the resistivity measurement is above the reference resistivity measured in open-hole at a location. This resistivity increase may be indicative of the presence of a solid annular fill material (e.g., resin) at that location. The resistivity measurement may also be presented as a log of whether resin is present or absent at various depths and/or locations of the well.

According to one or more embodiments, the downhole logging tool 126 may generate or otherwise initiate an electrical current to travel along the casing 122 (e.g., the current may travel up and down the casing 122). As the current traverses the casing 122, some amount of the current may leak out of the casing 122 and into the formation 114, which may result in one or more voltage drops along the casing 122. To this end, the downhole logging tool 126 may include one or more sensors, which can measure the potential difference (e.g., due to the voltage drops) along one or more portions and/or sections of the casing 122. Furthermore, the potential difference measured along a particular portion of the casing 122 may be used to calculate the resistivity of a corresponding portion of the annulus (e.g., the resistivity associated with the annular fill material 134 behind the particular portion of the casing 122). In this manner, the downhole logging tool 126 can obtain one or more resistivity measurements associated with one or more portions of the annulus 120 (e.g., and by extension, the annular fill materials 134 located in those respective portions).

As previously mentioned, the downhole logging tool 126 can transmit and/or otherwise provide the resistivity measurements to the data processing system 160. To this end, the data processing system can determine, based at least in part on the resistivity measurements, respective locations of one or more annular fill materials 134 in the annulus 120. For instance, in certain implementations, expected resistivity measurements (e.g., and/or resistivity measurement ranges) for certain annular fill materials may be known, predefined, or otherwise determined before placement of the downhole logging tool 126 in the wellbore 116. The downhole logging tool 126 may then be used to obtain or otherwise receive the resistivity measurements in the wellbore 116 and provide the resistivity measurements to the data processing system 160. The data processing system may be configured to compare the expected resistivity measurements with the obtained resistivity measurements to identify any number of annular fill materials 134 which may be present in the annulus 120. For example, the data processing system 160 may identify any matches and/or similarities between the obtained resistivity measurements and the expected resistivity measurements. Furthermore, the data processing system 160 may use the comparison to determine the location of one or more annular fill materials 134 in the annulus by identifying the respective portions of the annulus (e.g., and/or casing) corresponding to each obtained resistivity measurement.

For example, as shown in FIG. 1A, the annulus 120 may include respective annulus portions 146, 148, and 150. To this end, the downhole logging tool 126 may be configured to determine respective resistivity measurements for each of the annulus portions 146, 148, and 150. Using these respective resistivity measurements, the data processing system 160 may be configured to identify at least one annular fill material 134 corresponding to the respective annulus portions 146, 148, and 150. For instance, for each of the annular portions 146, 148, and 150, the data processing system 160 may determine whether a corresponding resistivity measurement exceeds a first predetermined resistivity threshold. If the resistivity of a particular annular portion 146, 148, and 150 exceeds this first predetermined resistivity threshold, the data processing system 160 may identify that annular portion 146, 148, and 150 as including resin. Additionally, for each of the annular portions 146, 148, and 150, the data processing system 160 may determine whether a corresponding resistivity measurement is lower than a second predetermined resistivity threshold (e.g., approximately $10^{-1}$ ohm-meters or $3.28 \times 10^{-1}$ ohm-feet). If the resistivity of an annular portion 146, 148, and 150 is lower than the second predetermined resistivity threshold, the data processing system 160 may identify that annular portion 146, 148, and 150 as including a conductive drilling fluid. Furthermore, for each of the annular portions 146, 148, and 150, the data processing system 160 may determine whether a corresponding resistivity measurement is within a predetermined resistivity range (e.g., within approximately $10^4$ ohm-meters to approximately $10^8$ ohm-meters, or within approximately $3.28 \times 10^4$ ohm-feet to $3.28 \times 10^8$ ohm-feet). If the resistivity of a particular annular portion 146, 148, and 150 is within the predetermined resistivity range, the data processing system 160 may identify that annular portion 146, 148, and 150 as including a non-conductive drilling fluid. It will be appreciated that the given resistivity threshold and ranges are merely for illustrative purposes, and that other resistivity thresholds and ranges are also contemplated.

Furthermore, in certain embodiments, the resistivity measurements of annular portions 146, 148 and 150 may simply be compared against one another. Based on these comparisons, the differences and/or contrasts between the respective resistivity measurements may be determined. As a result, the data processing system 160 may identify, based at least in part on the differences in the resistivity measurements, the presence of particular annular fill materials in the annular portions 146, 148, and 150.

Additionally, in some implementations, expected resistivity measurements associated with one or more mixtures of the annular fill materials 134 may also be determined. As such, upon comparing the expected resistivity measurements with the resistivity measurements obtained by the downhole logging tool 126, the data processing system 160 may determine a degree of mixture or the presence of contamination between one or more of the annular fill materials 134 in the wellbore 116. The data processing system 160 may also determine the locations of the mixtures or contamination within the annulus 120 of the wellbore 116.

Moreover, in certain cases, it may be determined (e.g., by the data processing system 160) that the expected resistivity measurements between certain types of annular fill material 134 do not provide sufficient contrast to distinguish between the annular fill materials 134. As a result, the resistivities associated with one or more annular fill materials 134 may be adjusted so as to provide more contrast against the other annular fill materials 134. For example one or more annular fill materials 134 may be injected with conductive ions so as to lower their respective resistivities, and thereby increase their resistive contrast with the other annular fill materials 134.

Furthermore, the data processing system 160 have access to resistivity measurements of the formation of the wellbore 116. For example, log data may have been obtained during an open-hole measurement of the wellbore 116 prior to the installation of casing. The open-hole resistivity measurements may also be used (in conjunction with the cased hole resistivity) by the data processing system 160 in identifying any number of annular fill materials 134 or determining characteristics of the annular fill materials 134. For instance, resistivity measurements in cased hole may be compared with resistivity measurements carried out in a non-cased (open-hole). To this end, the data processing system 160 may determine any deviations in the resistivity measurements of the cased hole (e.g., higher or lower) from the resistivity measurements obtained in open-hole. Based on such deviations, the data processing system 160 may determine the presence and/or lack of annular fill materials.

In some embodiments, the downhole logging tool 126 may also obtain measurements indicative of characteristics or features in the annular fill material 134. An annular material may have cracks, channels and/or defects, and a current path may be formed through such features. As such, resistivity measurements may be sensitive to conductive cracks or channels and/or defects. Such features may provide additional information of the condition of the wellbore 116. For example, the presence of certain cracks, channels, and/or defects may indicate problems in hydraulic isolation.

For example, in certain implementations, the annulus fill material may be highly resistive such that the logging tool 126 may determine relatively high orders of resistivity. In some cases, the resistivity may be high enough such that the logging tool 126 may be unable to obtain any measurements at all. Additionally, a defect in the annulus material (e.g., a crack or a channel filled with a conductive material such as a conductive mud) may result in a conduit for current flow that bypasses the resistive annular fill material. Thus, given prior knowledge of the highly resistive properties of the annular fill material, a logging tool 126 determining resistivity measurements orders of magnitude lower than expected in the presence of the annular fill material (e.g., or in some cases obtaining any resistivity measurements at all) may imply that a defect may exist within the annulus or wellbore 116.

Conversely, in certain resin a very similar approach, in the case of a resistive mud and conductive cement, the resistivity behavior can be used to detect the top-of cement (ie absence of conductive path through the annulus).

Figure 2:
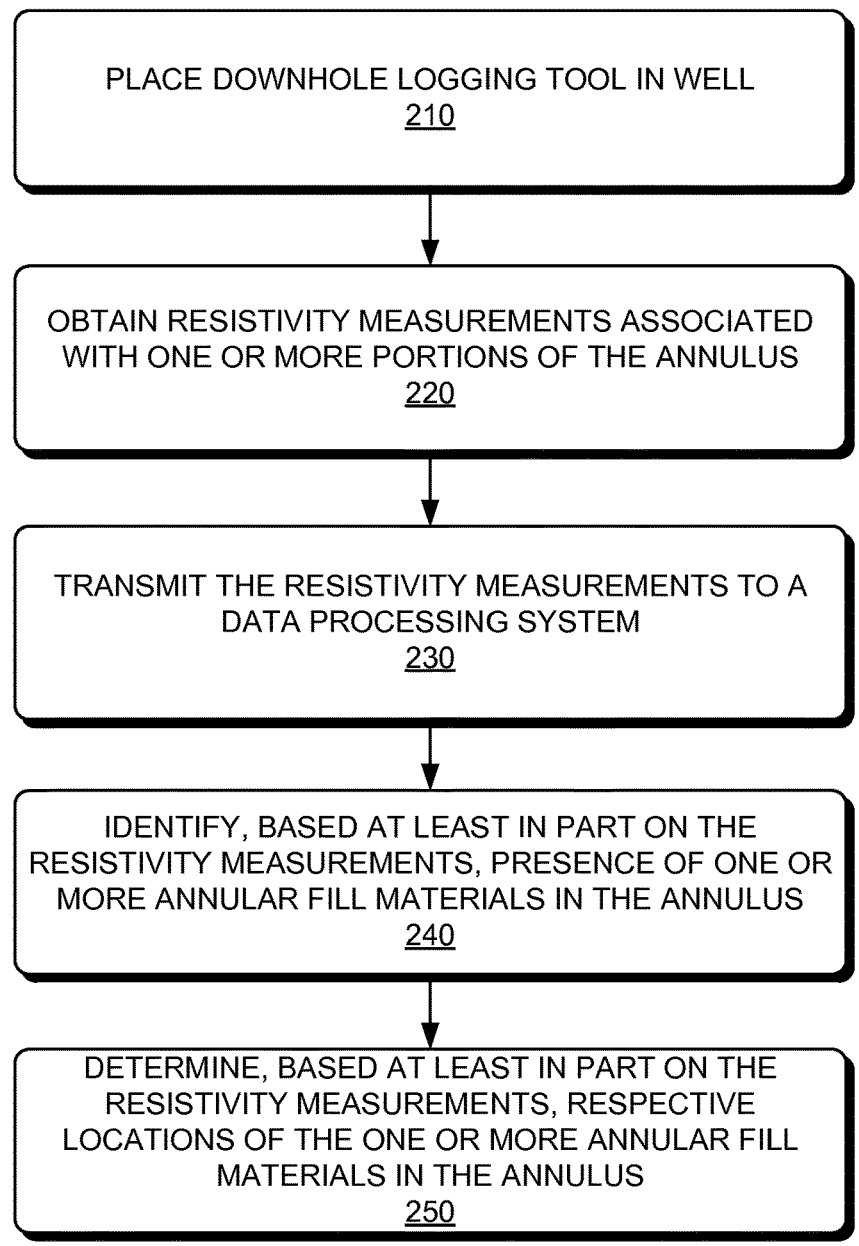
FIG. 2 illustrates a flow diagram of an example method for determining annular fill materials based on resistivity measurements in accordance with one or more example embodiments.

Referring now to FIG. 2, a method 200 is provide for determining annular fill material using resistivity measurements in accordance with one or more example embodiments. The method 200 may begin in block 210, where a downhole logging tool (e.g., downhole logging tool 126 of FIG. 1A) is placed in a well (e.g., wellbore 116). As described above, the wellbore 116 may include an annulus 120 between a casing 122 and the wellbore 116. In block 220, the downhole logging tool 126 may obtain resistivity measurements associated with one or more portions of the annulus 120. In block 230, the downhole logging tool 126 may transmit the resistivity measurements (e.g., as resistivity data 136) to a data processing system (e.g., data processing system 160). In block 240, the data processing system 160 may identify, based at least in part on the resistivity measurements, one or more annular fill materials in the annulus 120. In block 250, the data processing system 160 may determine, based at least in part on the resistivity measurements, respective locations of the one or more annular fill materials in the annulus.

Figure 3:
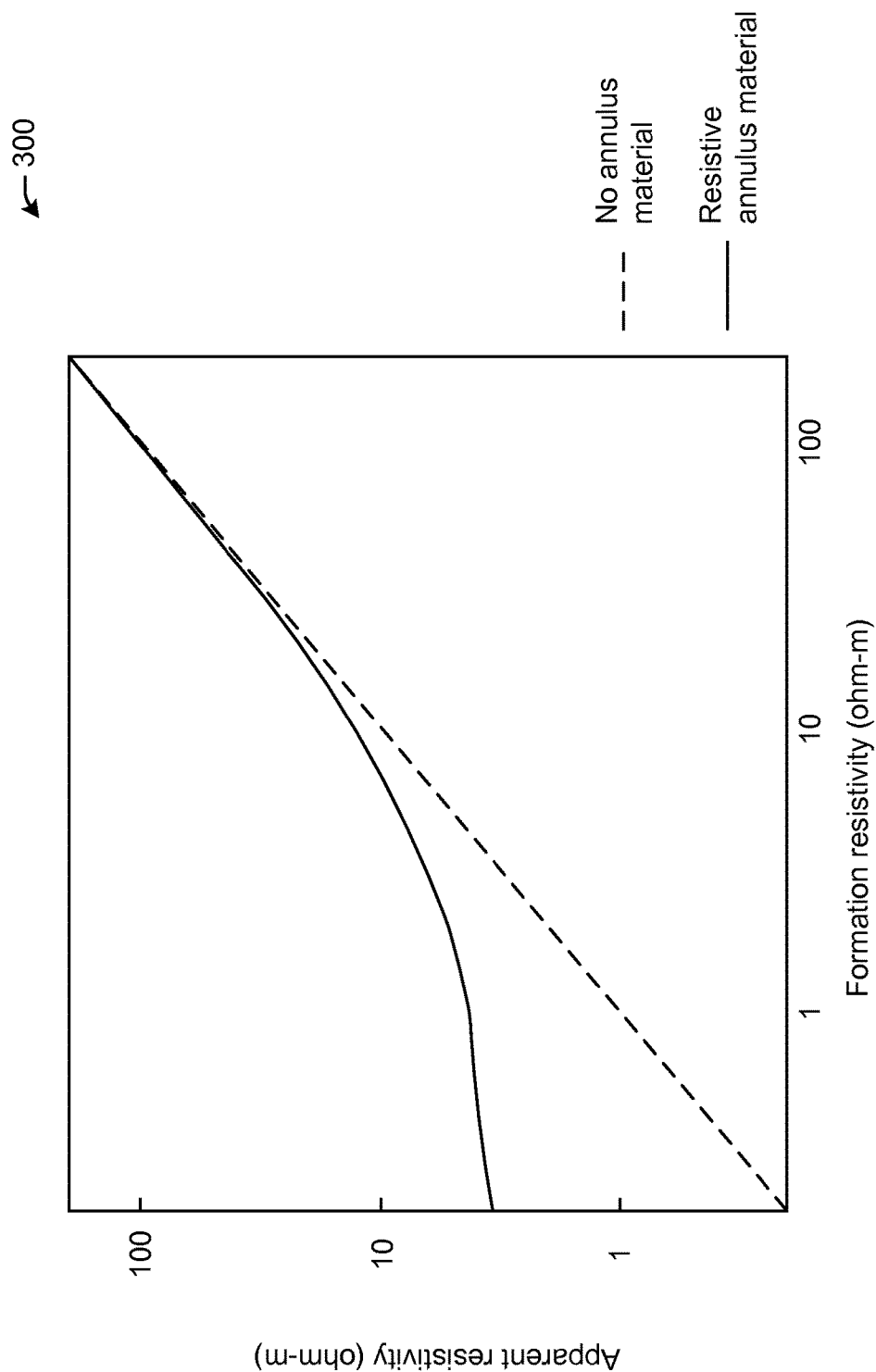
FIG. 3 illustrates an example model graph of resistivity measurements in accordance with one or more example embodiments.

Referring now to FIG. 3, a model graph 300 of apparent resistivity versus formation resistivity is provided in accordance with one or more example embodiments. Formation resistivity may represent resistivity value associated with a well formation itself (e.g., such as obtained during an open-hole measurement). The apparent resistivity may represent resistivity values associated with the wellbore (e.g., wellbore 116) along with any other materials (e.g., annular fill materials) that may be present in the wellbore.

Thus, as shown in the model graph 300, when no annulus material is present in the wellbore, apparent resistivity and formation resistivity may be associated with a linear (e.g., 1-to-1) relationship. However, if resistive annular fill material is present within the wellbore, the apparent resistivity of the wellbore may be consistently greater than the formation resistivity at certain formation resistivity ranges. In other words, the presence of resistive annular materials may cause an increase to the total measured resistivity (e.g., apparent resistivity) of the wellbore and/or an increased deviation from a measured formation resistivity. Such increases may be used to determine the presence of one or more annular fill materials in a wellbore. For instance, the modeled relationship of graph 300 (e.g., between apparent resistivity versus formation resistivity for when resistive annular fill material is present and for when such material is not present) may be used to determine and/or calculate one or more resistivity thresholds. These thresholds may be used to identify respective annular fill materials in the wellbore.

It should be noted that the behavior of a resistivity measurement is not limited to the modeled relationship of the graph 300 in FIG. 3. Rather, the graph 300 in FIG. 3 is an merely an example of a resistivity response in the presence of a substantially resistive annulus material. In one or more embodiments, modeled resistivity measurements in the presence of a resistive annulus material may be compared with open hole resistivity measurements, or cased hole resistivity measurements when the annulus is substantially conductive, or both open hole and conductive-annulus cased hole measurements. Such a comparison may be used to identify the presence and/or characteristics of the annular fill materials in the wellbore.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed. It will be understood that some or all of the blocks of the block diagrams and flow diagrams, and combinations of blocks in the block diagrams and flow diagrams, respectively, can be implemented by computer-executable program instructions.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements to be performed on the computer or other programmable apparatus to produce a computer-implemented process such that the instructions that execute on the computer or other programmable apparatus provide elements or operations for implementing the functions specified in the flow diagram block or blocks.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way used for one or more implementations or that one or more implementations necessarily include logic for deciding, with or without user input or prompting, whether these features, elements, and/or operations are included or are to be performed in any particular implementation.

Many modifications and other implementations set forth herein will be apparent having the benefit of the teachings presented in the foregoing descriptions and the associated drawings. Therefore, it is to be understood that the systems and methods described herein are not to be limited to the specific implementations disclosed and that modifications and other implementations are intended to be included within the scope of the appended claims. Although specific terms are employed herein, they are used in a generic and descriptive sense and not for purposes of limitation.

The invention claimed is:

1. A method, comprising:
   placing a downhole tool into a cased section of a well, wherein the cased section of the well comprises a casing attached to a formation in which the well is drilled, wherein an annulus is located between the casing and the formation and wherein placing the downhole tool into the cased section includes placing the downhole tool inside of the casing;
   determining, by the downhole tool, one or more electrical resistivity measurements associated with one or more portions of the cased section of the well;
   identifying, by a computer comprising one or more processors, based at least in part on the electrical resistivity measurements, a presence of one or more annular fill materials in the annulus; and
   determining, by the computer based at least in part on the electrical resistivity measurements, respective locations of the one or more annular fill materials in the well.

2. The method of claim 1, wherein the one or more annular fill materials comprises at least one of a conductive drilling fluid, non-conductive drilling fluid, or resin.

3. The method of claim 1, wherein determining the respective locations of the one or more annular fill materials further comprises:
   determining, before placing the downhole tool into the cased section of the well, one or more expected electrical resistivity measurements associated with the one or more annular fill materials; and
   comparing the one or more expected electrical resistivity measurements to the one or more electrical resistivity measurements determined by the downhole tool.

4. The method of claim 1, further comprising:
   determining that a first electrical resistivity measurement is greater than a predetermined electrical resistivity threshold, the first electrical resistivity measurement associated with a first portion of the well; and
   identifying, based at least in part on the first electrical resistivity measurement, a presence of resin in the first portion of the well.

5. The method of claim 1, further comprising:
identifying, based at least in part on the electrical resistivity measurements, a presence of one or more defects in the well.

6. The method of claim 5, wherein the one or more defects comprise at least one of a conductive crack or conductive channel.

7. The method of claim 1, further comprising:
determining that a first electrical resistivity measurement is within a predetermined resistivity range, the first resistivity measurement associated with a first portion of the well; and
identifying, based at least in part on the first electrical resistivity measurement, a presence of a non-conductive drilling fluid in the first portion of the well.

8. The method of claim 1, further comprising:
determining that a first electrical resistivity measurement is less than a predetermined electrical resistivity threshold, the first electrical resistivity measurement associated with a first portion of the well; and
identifying, based at least in part on the first electrical resistivity measurement, a presence of a conductive drilling fluid in the first portion of the well.

9. The method of claim 1, wherein identifying the presence of the one or more annular fill materials further comprises:
accessing open-hole electrical resistivity measurements associated with the formation, the open-hole electrical resistivity measurements obtained prior to installation of the casing in the well; and
comparing the open-hole electrical resistivity measurements with the determined electrical resistivity measurements.

10. A system comprising:
a logging tool configured to obtain electrical resistivity measurements associated with one or more portions of a cased section of a well, wherein the cased section of the well comprises a casing attached to a formation in which the well is drilled, wherein an annulus is located between the casing and the formation; and
a data processing component comprising:
at least one processor; and
at least one memory storing computer-executable instructions, that when executed by the at least one processor, causes the at least one processor to:
identify, based at least in part on the electrical resistivity measurements, a presence of one or more annular fill materials in the annulus; and
determine, based at least in part on the electrical resistivity measurements, respective locations of the one or more annular fill materials in the well.

11. The system of claim 10, wherein the one or more annular fill materials comprises at least one of a conductive drilling fluid, non-conductive drilling fluid, or resin.

12. The system of claim 10, wherein the computer-executable instructions to determine the respective locations of the one or more annular fill materials further comprises instructions to:
determine, before placing the downhole tool into the well, one or more expected electrical resistivity measurements associated with the one or more annular fill materials; and
compare the one or more expected electrical resistivity measurements to the one or more electrical resistivity measurements determined by the logging tool.

13. The system of claim 10, wherein the at least one memory of the data processing component further comprises computer-executable instructions to:
determine that a first electrical resistivity measurement is greater than a predetermined electrical resistivity threshold, the first electrical resistivity measurement associated with a first portion of the annulus; and
identify, based at least in part on the first electrical resistivity measurement, a presence of resin in the first portion of the annulus.

14. The system of claim 10, wherein the computer-executable instructions further cause the at least one processor to:
identify, based at least in part on the electrical resistivity measurements, a presence of one or more defects in the well.

15. The system of claim 10, wherein the at least one memory of the data processing component further comprises computer-executable instructions to:
determine that a first electrical resistivity measurement is within a predetermined electrical resistivity range, the first electrical resistivity measurement associated with a first portion of the annulus; and
identify, based at least in part on the first electrical resistivity measurement, a presence of a non-conductive drilling fluid in the first portion of the annulus.

16. The system of claim 10, wherein the at least one memory of the data processing component further comprises computer-executable instructions to:
determine that a first electrical resistivity measurement is less than a predetermined electrical resistivity threshold, the first electrical resistivity measurement associated with a first portion of the annulus; and
identify, based at least in part on the first electrical resistivity measurement, a presence of a conductive drilling fluid in the first portion of the annulus.

17. The system of claim 10, wherein the computer-executable instructions to identify the presence of annular fill materials further comprise instructions to:
access open-hole electrical resistivity measurements associated with a formation adjacent to the cased well, the open-hole electrical resistivity measurements obtained prior to installation of a casing in the cased well; and
compare the open-hole electrical resistivity measurements with the obtained electrical resistivity measurements.

18. A non-transitory computer-readable medium comprising computer-executable instructions, that when executed by at least one processor, causes the at least one processor to:
receive, from a logging tool, one or more electrical resistivity measurements;
identify, based at least in part on the one or more electrical resistivity measurements, one or more annular fill materials in an annulus located between a casing of the well and a formation, wherein the casing is attached to the formation; and
determine, based at least in part on the electrical resistivity measurements, respective locations of the one or more annular fill materials.

19. The computer-readable medium of claim 18, wherein the one or more annular fill materials comprises at least one of a conductive drilling fluid, non-conductive drilling fluid, or resin.

20. The computer-readable medium of claim 18, wherein the computer-executable instructions to determine the respective locations of the one or more annular fluids further comprises instructions to:

determine one or more expected electrical resistivity measurements associated with the one or more annular fill materials; and compare the one or more expected electrical resistivity measurements to the one or more received electrical resistivity measurements.

* * * * *